US009391922B2

(12) United States Patent
Herington et al.

(10) Patent No.: US 9,391,922 B2
(45) Date of Patent: *Jul. 12, 2016

(54) COMPUTER WORKLOAD REDISTRIBUTION SCHEDULE

(71) Applicant: Hewlett-Packard Development Company, L.P., Houston, TX (US)

(72) Inventors: Daniel Edward Herington, Kinnelon, NJ (US); Thomas Edwin Turicchi, Jr., Dallas, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,039

(22) Filed: Aug. 5, 2015

(65) Prior Publication Data

US 2016/0028649 A1  Jan. 28, 2016

Related U.S. Application Data

(63) Continuation of application No. 11/409,851, filed on Apr. 24, 2006, now Pat. No. 9,128,766.

(51) Int. Cl.
| | |
|---|---|
| *G06F 9/46* | (2006.01) |
| *G06F 1/26* | (2006.01) |
| *H04L 12/911* | (2013.01) |
| *G06F 9/50* | (2006.01) |
| *G06F 9/48* | (2006.01) |
| *G06F 1/32* | (2006.01) |
| *H04L 29/08* | (2006.01) |

(52) U.S. Cl.
CPC ............ *H04L 47/783* (2013.01); *G06F 1/3203* (2013.01); *G06F 1/329* (2013.01); *G06F 9/4856* (2013.01); *G06F 9/5061* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 6,351,775 B1 | 2/2002 | Yu | |
| 6,785,827 B2 | 8/2004 | Layton et al. | |
| 6,795,928 B2 | 9/2004 | Bradley et al. | |
| 6,925,573 B2 | 8/2005 | Bodas | |
| 7,213,065 B2 | 5/2007 | Watt | |
| 7,308,687 B2 | 12/2007 | Trossman et al. | |
| 7,325,050 B2 | 1/2008 | O'Connor et al. | |
| 7,350,186 B2 | 3/2008 | Coleman et al. | |
| 7,693,991 B2 | 4/2010 | Greenlee et al. | |
| 2002/0152305 A1 | 10/2002 | Jackson et al. | |
| 2003/0158884 A1 | 8/2003 | Alford, Jr. | |
| 2003/0188208 A1 | 10/2003 | Fung | |
| 2004/0111509 A1 | 6/2004 | Eilam et al. | |
| 2004/0122950 A1 | 6/2004 | Morgan et al. | |
| 2004/0181794 A1 | 9/2004 | Coleman et al. | |
| 2004/0267932 A1 | 12/2004 | Voellm et al. | |
| 2005/0102400 A1 | 5/2005 | Nakahara et al. | |
| 2005/0160133 A1 | 7/2005 | Greenlee et al. | |
| 2005/0210469 A1 | 9/2005 | Chung et al. | |
| 2005/0210470 A1 | 9/2005 | Chung et al. | |
| 2006/0080268 A1 | 4/2006 | Afeyan et al. | |
| 2006/0212636 A1 | 9/2006 | Yasuo | |
| 2006/0218270 A1 | 9/2006 | Migita et al. | |
| 2006/0259621 A1 | 11/2006 | Ranganathan et al. | |
| 2007/0038493 A1 | 2/2007 | Subrahmonia et al. | |

OTHER PUBLICATIONS

The American Heritage College Dictionary, Fourth Edition, Copyright 2002, pp. 1-3.

*Primary Examiner* — Tammy Lee
(74) *Attorney, Agent, or Firm* — International IP Law Group, PLLC

(57) ABSTRACT

A computer system has a capacity planner for creating and updating a workload redistribution schedule. A migration utility provides for redistribution of the workloads. A redistribution orchestrator directs, according to the schedule, the migration utility to implement the workload redistributions.

20 Claims, 2 Drawing Sheets

COMPUTER WORKLOAD REDISTRIBUTION SCHEDULE

CROSS-REFERENCE TO RELATED APPLICATION

This application is a continuation of co-pending U.S. patent application Ser. No. 11/409,851, by Daniel Edward Herington et al., filed Apr. 24, 2006, the entire contents of which are hereby incorporated by reference as though fully set forth herein.

BACKGROUND OF THE INVENTION

Herein, related art is discussed to aid in understanding the invention. Related art labeled "prior art" is admitted prior art; related art not labeled "prior art" is not admitted prior art.

One of the classic challenges for information technology (IT) managers is to distribute software workloads among computing resources to ensure that each workload has sufficient resources to accomplish its task even during peak usage for the lowest total cost of ownership. One strategy would be to allow workloads to share a computing resource sufficient to handle the sum of the peak utilizations for the workloads. A better strategy is to take into account that workloads can have peak utilization at different times, and so allow workloads to share a computing resource sufficient to handle the peak utilization of their combined loads. The latter strategy can require more detailed knowledge of periodic changes in utilization for each workload, but allows tighter packing of the workloads.

Resource utilization by a workload can vary both periodically and non-periodically over time. In the latter case, there is often a trend for increased overall utilization, at least for successful enterprises. Resources that were once sufficient to handle installed workloads may become insufficient with increased utilization. Therefore, IT managers monitor resource utilization, acquire new resources, and redistribute workloads on an ongoing basis. An objective of the present invention is to provide for more optimal workload distributions in certain circumstances.

BRIEF DESCRIPTION OF THE DRAWINGS

The following drawings are of embodiments/implementations of the invention and not of the invention itself.

DETAILED DESCRIPTION

Figure 1:
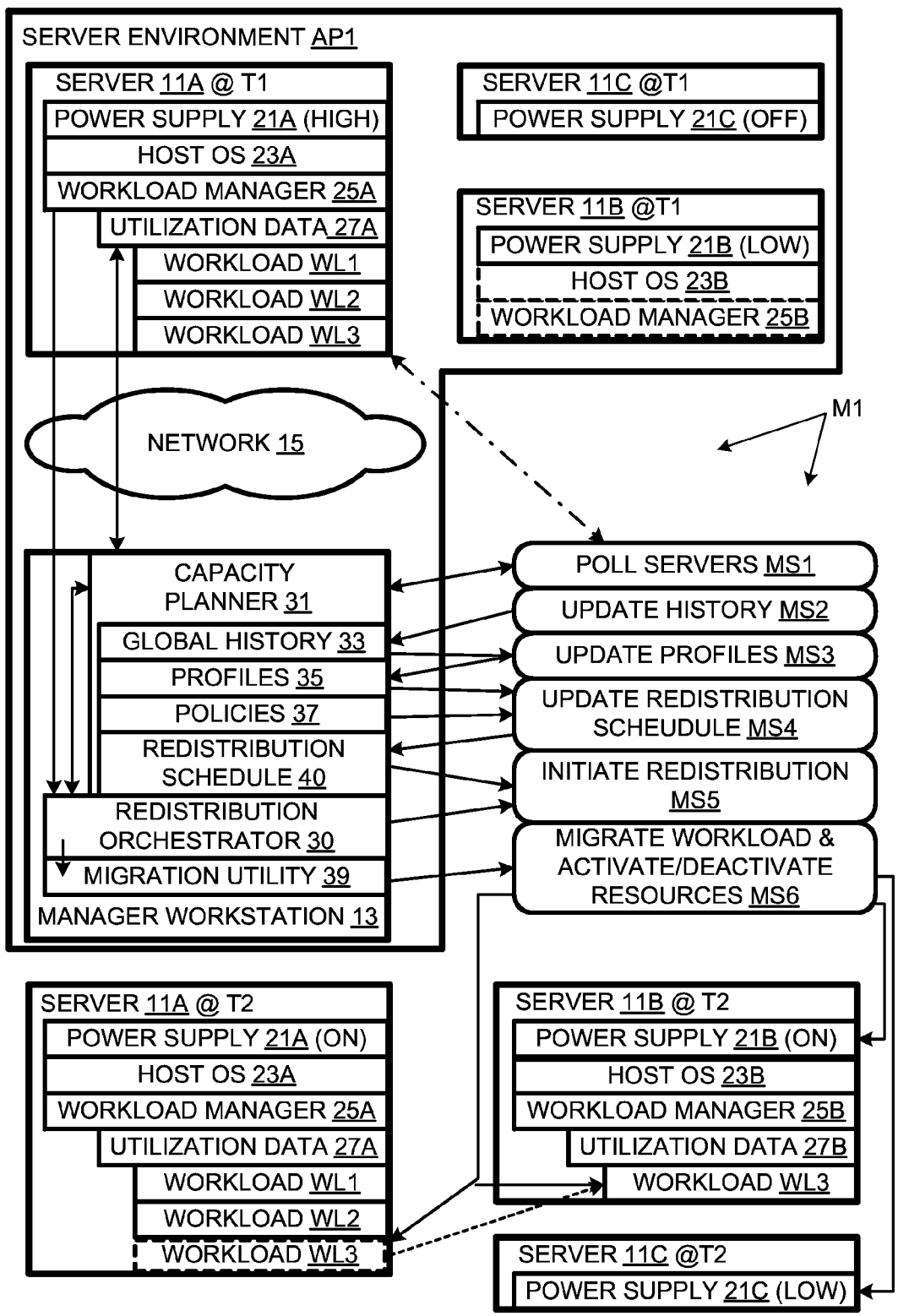
FIG. 1 is a hybrid block diagram of a system and a flow chart of a method practiced in the context of the system in accordance with an embodiment of the present invention. Method segments are in rounded rectangles.

A server environment AP1 in accordance with the present invention comprises servers 11A, 11B, and 11C, a management workstation 13, and a network fabric 15, as shown in FIG. 1. Note that in FIG. 1, each server 11A, 11B, 11C is shown at two different time slots: 1) at a "daily" time slot T1, and 2) at a "nightly and weekend" time slot T2. Server environment AP1 is presented as a basic implementation of the invention. The invention provides for embodiments with any number of computers of any types. Not all embodiments have a distinct workstation manager, as its functions can be assumed by one of the servers.

Server 11A includes a power supply 21A, a host operating system 23A, a workload manager 25A, and a utilization data file 27A. At time slot T1, server 11A runs three workloads, WL1, WL2, and WL3. Server 11B has a power supply 21B, and server 11C has a power supply 21C. At time T1 no loads are running on servers 11B and 11C. Server 11B is in a dormant low-power state. Its host operating system 23B and its workload manager 25B are loaded, but the processors on which it is to run are in a halt state so that host operating system 23B is not running The low power state allows an instant-on response for scheduled and unscheduled workload migrations. At time T1, server 11C is not scheduled to run a workload and is not needed as an instant-on reserve (since server 11B is available for that purpose); accordingly, server 11C is shut down and power supply 21C is off.

At time slot T2, workloads WL1 and WL2 are running on server 11A, while workload WL3 has been redistributed to server 11B, which has been activated. In the meantime, server 11C has been booted up and set to a low-power dormant state to function as an instant-on reserve, e.g., in case a sudden increase in demand for workload WL1 requires that a server be dedicated to it. Workloads WL1, WL2, and WL3 can be applications or virtual machines running applications. The applications can be web servers, databases, accounting programs, etc. The virtual machines can provide for various operating systems running on a virtual machine host layer of host operating system 23A.

Workload manager 25A monitors resource utilization by workloads WL1, WL2, and WL3 while they are running on server 11A. In addition, workload manager 25A can monitor other data such as application run time, queue lengths, number of processes, users, connections, etc. to evaluate utilization. The resulting resource utilization data is time-stamped and stored as utilization data 27A.

Workload manager 25A uses this information to determine the best allocation of the resources associated with server 11A to workloads WL1, WL2, and WL3. In accordance with this determination, workload manager 25A can reallocate the resources of server 11A among workloads WL1, WL2, and WL3. If the combined demands for the workloads leave too little tolerance for temporary usage spikes to ensure acceptable performance and reliability, workload manager 11A issues a resource request to management workstation 13. Note that workload manager 25B functions similarly when running, and that server 11C also has a similarly functioning workload manager when it is active.

Management workstation 13 hosts a redistribution orchestrator 30, a capacity planner application 31, a global use history 33, workload profiles 35, management policies 37, a migration utility 39, and a redistribution schedule 40. Capacity planner 31: 1) gathers utilization data, e.g., utilization data 27A to update global history 33; 2) generates workload demand profiles 35 from the data in history 33; and 3) generates and updates redistribution schedule 40 regularly based on workload profiles 35 and management policies 37.

Orchestrator 30 directs migration utility 39 as required to implement the scheduled redistributions. If the current workload distribution isn't working, then a workload manager can trigger capacity planner 31 to gather fresh utilization data and use it to generate update history 33 and profiles 35, and to generate a new workload redistribution schedule from these. Such an asynchronous demand can arise when a workload manager detects an unexpected demand on a workload, when a server or other resource fails, or when a disaster takes out one or more servers.

Management policies 37 call for redistributing workloads as frequently as once per hour so that during each distribution the following criteria are met. Within each distribution, workloads are consolidated as much as possible for up to a configurable percentage (e.g., 90%) of the expected peak combined utilization per resource to minimize the number of active servers. Within these constraints, management policies 37 require workloads to be distributed as evenly as possible among active servers to leave as much headroom as possible. Management policies 37 may call for placing servers scheduled to be running workloads in a dormant "instant on" state when they are not running workloads. Management policies 37 may also call for shutting down servers that are not scheduled to run workloads, but for rebooting these servers when they subsequently become scheduled to run workloads. These management policies can be updated or revised by an IT manager. Other possible management policies are discussed further below.

Capacity planner 31 implements a method M1 in accordance with the invention, as shown on the right in FIG. 1. At method segment MS1, capacity planner polls servers 11A and 11B for utilization data; this polling is performed periodically, e.g., every five minutes, as well as in response to a resource request. For example, if an IT professional tries to add a workload to server 11A, workload manager 11A can issue a resource request if it determines that server 11A cannot handle the new workload without stressing available resources. Alternatively, workload manager 11A can send a resource request when it detects that an increase in demand for the already installed workloads is stressing resources.

At method segment MS2, capacity planner 31 updates global use history 33 by retrieving information from utilization data 27A from all servers; the resource utilizations of inactive servers, e.g., servers 11B and 11C at time slot T1, are zero. The utilization data describes resource utilization by a given workload for a given time and given a particular software and hardware configuration for the host server. Utilization data is accumulated every five minutes for the life of a server so that hourly, yearly, monthly, weekly, and daily usage patterns can be discerned.

At method segment MS3, the global utilization history is analyzed to build and update workload profiles 35, which model each workload's utilization as a function of time. The analysis of method segment MS3 may discover time-based patterns that can be extrapolated to predict future usage. The prediction can be of the form that the future will replicate the past, e.g., since an Internet portal has been busy every weekday at 8pm for the past two months, it will continue to be busy at 8pm everyday in the future. However, predictions can also incorporate trending, e.g., the prediction can be to the following effect "while the application will likely continue to be busy at 8pm, the magnitude of the busy peaks will grow 10% over the next six months". Furthermore, the chronology can be associated with external events (e.g., economic indicators, weather) so that the predictions can be event based and not merely time based.

Note that while method segments MS2 and MS3 are shown as following the polling of method segment MS1, this order is more logical than chronological. If global use history 33 has been recently updated and if profiles have been recently calculated, a resource request can be processed using existing profiles without further updating history 33 and profiles 35. Also, in some cases, e.g., with a new workload, there may be no historical utilization data from which to predict future utilization. In such cases, a default profile can be used, or an IT manager can specify a profile for the new workload.

At method segment MS4, capacity planner 31 updates workload distribution schedule 40 based on server resources, workload profiles 35, and management policies 37. The workload redistribution schedule specifies which workloads are to be running on which servers for any given month, week, day, and hour. It also specifies which servers are to be active, which are to be in low-power states, and which servers are to be shut down for each schedule time slot.

In this case (as an example), it has been determined that workload WL3 is in great demand in the late evening (e.g., as clients access server environment AP1 after dinner), but is used lightly during working hours, while workloads WL1 and WL2 have constant moderate use. Accordingly, capacity planner 31 schedules workload WL3 to run on server 11B between 6pm and 12pm on weekdays and during weekends; the rest of the time, workload WL3 is scheduled to run on server 11A. Correspondingly, capacity planner 31 schedules server 11B to be activated just prior to the times workload WL3 is to be running on it, and to return to a low-power state whenever workload is redistributed to server 11A. Concomitantly, server 11C is scheduled to be booted and set to a low power state when server 11B is to be activated, and is scheduled to be shut down when server 11B is scheduled to be set to a low power state. Thus, when servers 11A and 11B are active, server 11C is ready to receive any overload from them; when server 11B is inactive, it can serve as an instant-on spare and so server 11C is not needed for this purpose.

At method segment MS5, orchestrator 30 directs migration utility 39 to implement a redistribution at a time specified in schedule 40. At method segment MS6, migration utility 39 migrates workloads as directed by orchestrator 30. The redistribution can involve changing resource power states, activating and deactivating copies of workloads, and transferring configuration and state data to servers to which workloads are migrated. Note that method segments MS1-MS4 are iterated periodically, while method segments MS5 and MS6 are dependent on redistribution schedule 40.

Once a redistribution is implemented, any "freed" resource from which all workloads have been removed, can be shut down or placed into a lower-power state at method segment MS6. For example a system may enter a lower-power state such as a C1 processor state, a D1 device state, a G1 global state, etc., as defined by the ACPI specification. For example, a Montecito Itanium processor (available from Intel Corporation) can be set to a "Halt_Lite" state. In this Halt_Lite state, processing is halted but state data is preserved so that full operation can be resumed with minimum latency. Also, memory modules can be turned off or put in lower power modes. In addition, storage media can enter low power modes or hard disk spindles can be turned off. Also, parts of a network fabric can be powered down.

"Advanced Configuration and Power Interface Specification" (ACPI) promulgated by Hewlett-Packard Corporation, Intel Corporation, Microsoft Corporation, Phoenix Technologies Ltd., and Toshiba Corporation, Revision 3.0, Sep. 2, 2004, particularly pages 13-23. The ACPI specification defines global power states G0-G3, device states D0-D3, and processor states C0-C3. In addition, there are "sleeping" states with state G1 and performance level states P0, and P1-Pn within device state D0 and processor state C0. Not all systems, devices, and processors have all states. Systems, devices, and processors not necessarily conforming to the ACPI standard, often have analogous states.

Generally, management policies, including management policies 37, can be used to define a (possibly very complex) criterion for evaluating potential redistributions. Management policies 37 take power conservation into consideration to meet economic, conservation, and availability limitations.

Other management policies include very different factors and not all specify power conservation as a factor. Some examples are considered below.

Some interesting management policy factors apply to server environments that are geographically distributed over two or more continents. The policies may include restrictions based on export laws and software licenses; for example, it may not be possible to migrate certain encryption programs to an overseas site. The policies might require that mirror instances of a workload not be located at the same site where they both might fail in the event of a local power outage. The management policies might favor servers that are completely owned by a customer over those in which the vendor retains usage rights, e.g., reserve processors.

Management policies can also take into account the relative ease or difficulty of migrating workloads. This is usually expressed as the cost of moving an application—which may encompass such factors as how long it takes to do so, whether an outage is incurred for moving it, whether a performance penalty is incurred for moving it, the application's uptime requirement (it's tolerance for outage), and its tolerance for performance degradation. Also considered are the seriousness and the expected duration of the current resource shortfall.

More headroom for exceeded predictions may be desired if migration is time consuming and/or expensive. On the other hand, if migration is fast and inexpensive, lower headroom may be acceptable and a workload reallocation may be more readily undertaken. In general, a management policy can specify a minimum time between redistributions that is large relative to the latencies involved in redistribution to limit the impact of redistributions on performance. In addition, a management policy can require redistributions to be scheduled during periods of low utilization of the resources involved in the redistribution.

Figure 2:
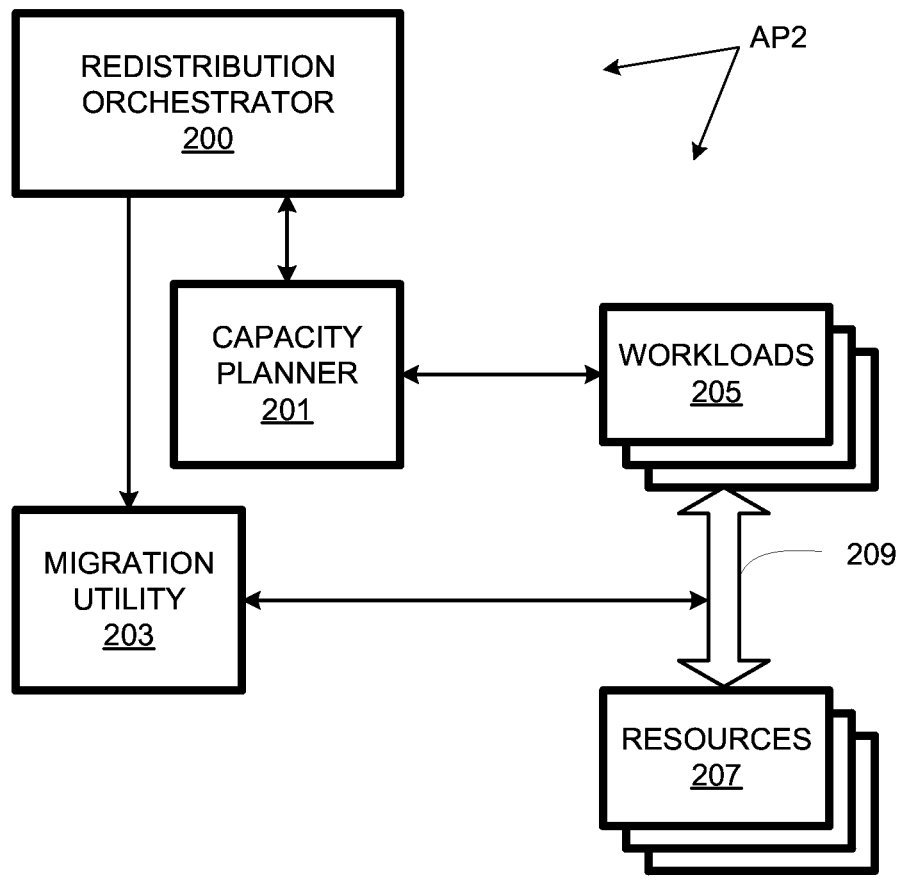
FIG. 2 is a block diagram of another system in accordance with another embodiment of the invention.
Figure 3:
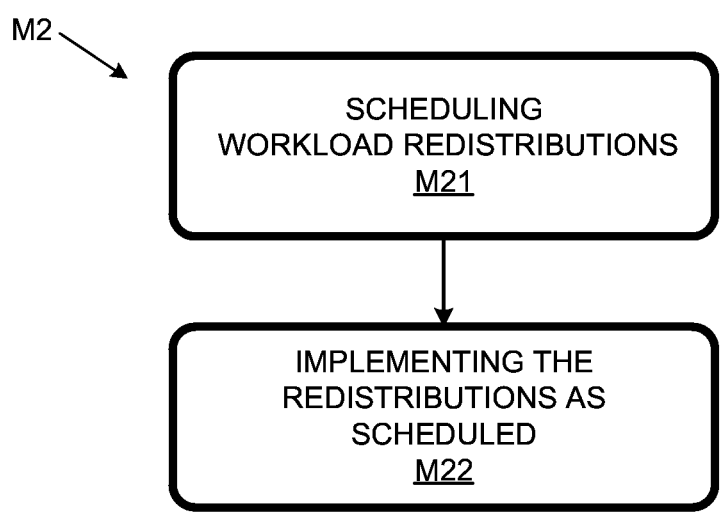
FIG. 3 is a flow chart of another method in accordance with an embodiment of the invention.

A second system AP2 in accordance with another embodiment of the invention is shown in FIG. 2 comprising a redistribution orchestrator 200, a capacity planner 201, and a migration utility 203. Orchestrator 200 directs migration utility 203 to execute a redistribution, e.g., a change in the assignment 209 of workloads 205 to resources 207, in accordance with a schedule produced by capacity planner 201. In this system, a method M2 is implemented, as flow-charted in FIG. 3. A first method segment M21 involves planning a schedule of plural workload redistributions as a function of time. A second method segment M22 involves a migration utility for implementing said workload redistributions in response to direction from said capacity planner.

The present invention removes a constraint that limits the extent to which one-shot redistributions can optimize resource allocation. A one-shot redistribution accommodates a peak-combined workload on a server for all hours, days, weeks, months, etc. The present invention can optimize per scheduled period. For example, if a workload has a daytime peak utilization and a lesser nighttime peak utilization, the present invention would call for a nighttime distribution that accommodated on the lesser nighttime peak, whereas a one-shot redistribution would call for a fulltime distribution that provides headroom for a peak even at time when it is not expected to occur, e.g., providing headroom at night for a peak that only occurs in daytime. Accordingly, the present invention might be able to relieve a server of nighttime duty, thus saving power and the associated costs.

Herein, a "computer" is a device that manipulates data in accordance with a program of instructions. A "server" is a computer that provides services to other computers. A "workload" is a set of software programs, e.g., application programs and virtual machines, that require computer resources to run. "Computer resources" includes, but is not limited to, processor cycles, memory capacity, storage capacity, and communications bandwidth. A "workload" distribution is an assignment of workloads to resources or vice versa. A "redistribution" is a change of a distribution, e.g., a reassignment of workloads to resources.

Herein, "schedule" means a list of one or more actions (e.g., workload migration) that specifies an order or specific times the actions are to occur. A "one-shot" schedule specifies a single (possibly complex) action that is to occur at a specified time, e.g., the next time a lull in workload activity is expected. A "sequence" schedule specifies the order in which plural events are to be performed; for example, the migrations needed to achieve a given redistribution may need to be performed in a certain order to avoid temporarily overloading some server or other resource. A "multi-shot" schedule specifies a series of actions and the times at which they are to be performed. Periodic schedules are multi-shot; for example, performing a redistribution for day time operation and reversing the redistribution for night time operation.

Since much of the present invention involves software, there are many ways functions can be redistributed among programs. In the illustrated embodiment, the capacity planner interacts directly with workload managers on the servers and the migration utility. In an alternative embodiment, a capacity advisor is used to calculate the new distribution, but it interacts with the migration utility and workload managers through a separate "redistribution" program. Also, the capacity planner and migration utility can be considered software or the software together with the hardware on which the software runs, depending on context. These and other variations upon and modification to the illustrated embodiment are provided for by the present invention, the scope of which is defined by the following claims.

A computer-implemented method comprises planning a schedule of plural workload redistributions, and implementing the workload redistributions according to the schedule. A computer-readable media comprises redistribution orchestration software for directing a migration utility to implement software workload redistributions according to a schedule planned by capacity planning software. The orchestration software includes code for responding to a detection of a resource shortfall or failure by directing the capacity planning software to compile resource utilization data for the workloads as a function of time and for directing the capacity planner to update the schedule in part as a function of the data. The computer-readable media further comprises the migration utility. The schedule for activating an inactive computer after the planning and prior to the migration utility implementing the redistribution, involves migrating a workload to the computer.

What is claimed is:

1. A method comprising:
   executing workloads on at least one server, the workloads including a first workload and a second workload executing on a first server during a first allocation period;
   collecting, via a processor, resource-utilization data for the workloads, the resource-utilization data indicating amounts of processing resources consumed by the workloads;
   updating, via the processor, an original schedule of workload redistributions based, at least in part, on the resource-utilization data and a management policy to yield an updated schedule, the updated schedule specifying workload redistributions requiring opposing migrations in that the updated schedule specifies the first workload is to be executed on a second server, different from the first server, during a second allocation period after the first allocation period, and on the first server during a third allocation period after the second allocation period; and implementing, via the processor, the updated schedule at least in part by implementing the opposing migrations by migrating the first workload from the first server to the second server for the second allocation period, and migrating the first workload from the second server to the first server for the third allocation period, and wherein the second workload executes on the first server during the second allocation period and the third allocation period.

2. The method of claim 1, wherein the second server is inactive during the first allocation period and the third allocation period.

3. The method of claim 1, wherein the updated schedule specifies that the second server is to be in a power-on state during the first allocation period and the third allocation period.

4. The method of claim 1, wherein implementing the updated schedule comprises maintaining the second server in a power-on state during the first allocation period and the third allocation period.

5. The method of claim 1, wherein implementing the updated schedule comprises migrating the first workload to the second server twice.

6. The method of claim 1, wherein the updated schedule specifies that the first workload is to be executed on the second server during a fourth allocation period after the third allocation period.

7. The method of claim 6, wherein the updated schedule specifies that a third server, different than the first server and the second server, is to be in a power-off state in the first allocation period and the third allocation period, and in a power-on state in the second allocation period and the fourth allocation period.

8. The method of claim 6, wherein a third server is available to execute the workloads, and wherein the third server is inactive during the first allocation period, the second allocation period, the third allocation period, and the fourth allocation period.

9. The method of claim 1, wherein the management policy comprises to shut down servers not scheduled to run a workload.

10. The method of claim 1, wherein the management policy comprises to reduce a number of active servers as permitted by a configurable percentage of peak combined utilization per resource of active servers.

11. The method of claim 1, wherein the updated schedule specifies that the second server is to be activated at a time before the second allocation period and to be deactivated at a time after the second allocation period, wherein the first server is disposed in a first geographic location, and wherein the second server is disposed in a second geographic location different than the first geographic location.

12. A computer system comprising:
a processor; and
memory storing instructions executable by the processor to:
collect resource-utilization data for workloads executing on at least one server, the workloads including a first workload and a second workload executing on a first server during a first allocation period, wherein the resource-utilization data indicates amounts of processing resources consumed by the workloads;

update an original schedule of workload redistributions based, at least in part, on the resource-utilization data and a management policy to yield an updated schedule, the updated schedule specifying workload redistributions requiring opposing migrations in that the updated schedule specifies the first workload is to be executed on a second server, different from the first server, during a second allocation period after the first allocation period, and on the first server during a third allocation period after the second allocation period; and implement the updated schedule at least in part by implementing the opposing migrations by migrating the first workload from the first server to the second server for the second allocation period, and migrating the first workload from the second server to the first server for the third allocation period, and wherein the second workload to execute on the first server during the second allocation period and the third allocation period.

13. The computer system of claim 12, wherein the updated schedule specifies that the first workload is to be executed on the second server during a fourth allocation period after the third allocation period, and wherein the second server is inactive during the first allocation period and the third allocation period.

14. The computer system of claim 13, wherein a third server, different than the first server and the second server, is available to execute the workloads, and wherein the updated schedule specifies that the third server is to be in a power-off state in the first allocation period and the third allocation period, and in a power-on state in the second allocation period and the fourth allocation period.

15. The computer system of claim 12, wherein the updated schedule specifies that the second server is to be in a power-on state during the first allocation period and the third allocation period, and wherein to implement the updated schedule comprises to maintain the second server in the power-on state during the first allocation period and the third allocation period.

16. The computer system of claim 12, wherein the management policy comprises to shut down servers not scheduled to run a workload.

17. A non-transitory computer-readable media comprising instructions that direct a processor to:
collect resource-utilization data for workloads executing on at least one server, the workloads including a first workload and a second workload executing on a first server during a first allocation period, wherein the resource-utilization data indicates amounts of processing resources consumed by the workloads;

update an original schedule of workload redistributions based, at least in part, on the resource-utilization data and a management policy to yield an updated schedule, the updated schedule specifying workload redistributions requiring opposing migrations in that the updated schedule specifies the first workload is to be executed on a second server, different from the first server, during a second allocation period after the first allocation period, and on the first server during a third allocation period after the second allocation period; and implement the updated schedule at least in part by implementing the opposing migrations by migrating the first workload from the first server to the second server for the second allocation period, and migrating the first workload from the second server to the first server for the third allocation period, and wherein the second workload to execute on the first server during the second allocation period and the third allocation period.

18. The non-transitory computer-readable media of claim 17, wherein the updated schedule specifies that the first workload is to be executed on the second server during a fourth allocation period after the third allocation period, and wherein the second server is inactive during the first allocation period and the third allocation period.

19. The non-transitory computer-readable media of claim 18, wherein a third server, different than the first server and the second server, is available to execute the workloads, and wherein the updated schedule specifies that the third server is to be in a power-off state in the first allocation period and the third allocation period, and in a power-on state in the second allocation period and the fourth allocation period.

20. The non-transitory computer-readable media of claim 17, wherein the updated schedule specifies that the second server is to be in a power-on state during the first allocation period and the third allocation period, and wherein to implement the updated schedule comprises to maintain the second server in the power-on state during the first allocation period and the third allocation period.

* * * * *